Feb. 6, 1923.
E. F. HATHAWAY.
MECHANICAL CONTROLLING MECHANISM.
ORIGINAL FILED NOV. 10, 1916.
1,444,503.
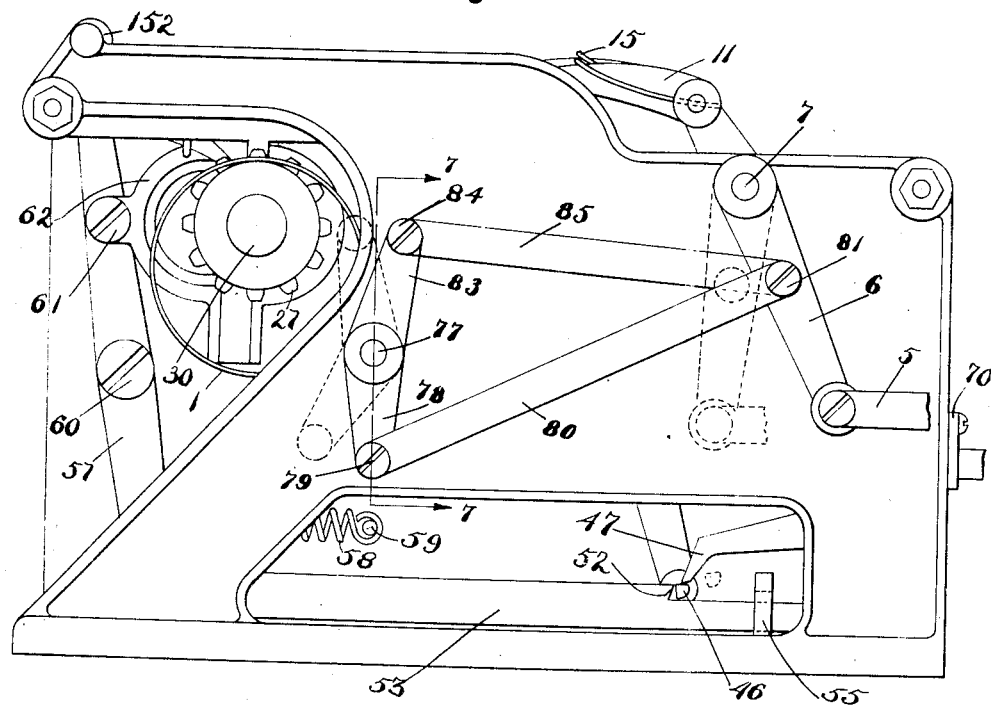
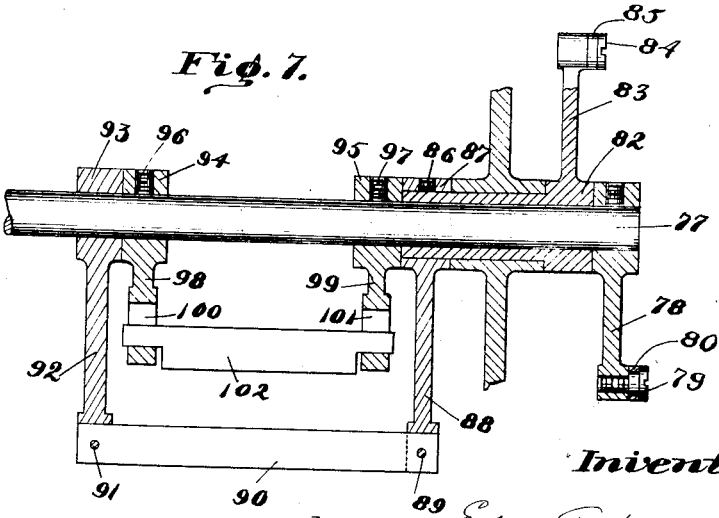

Feb. 6, 1923.
E. F. HATHAWAY.
MECHANICAL CONTROLLING MECHANISM.
ORIGINAL FILED NOV. 10, 1916.
1,444,503.
8 SHEETS—SHEET 2.
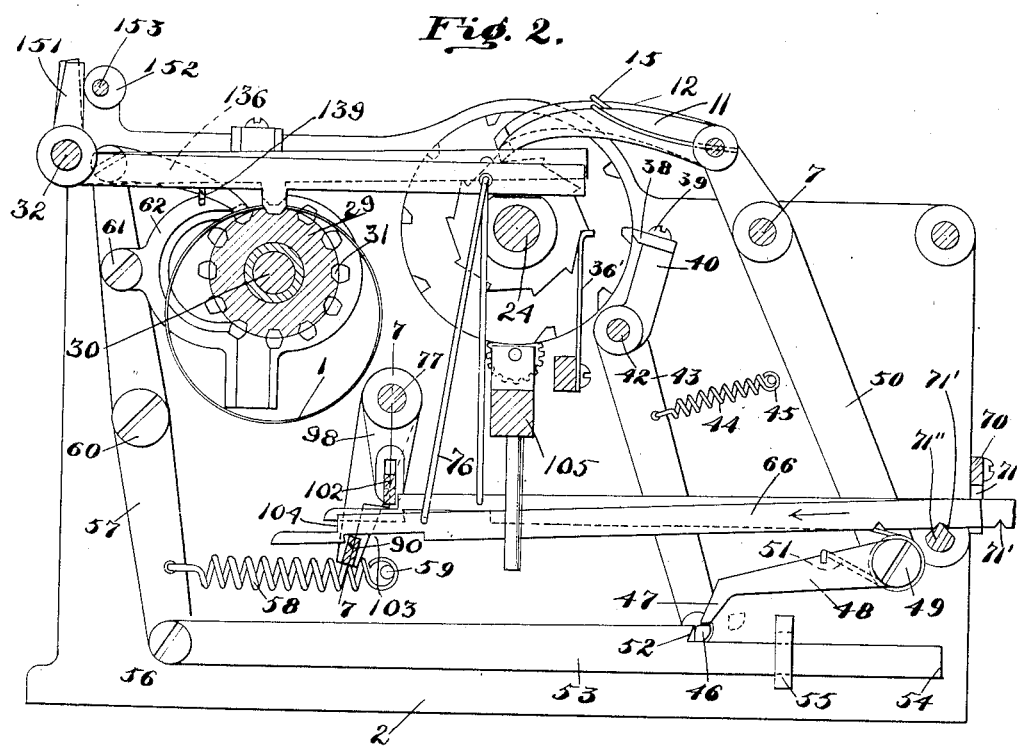
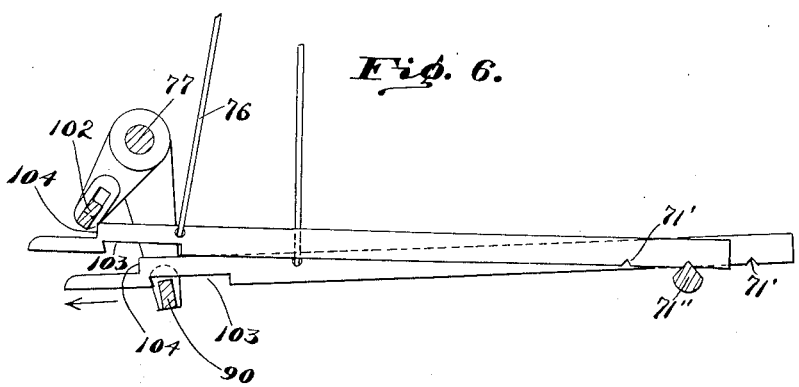
Inventor:
Edgar F. Hathaway
by
Emery, Booth, Janney and Varney
Attys.

Feb. 6, 1923.

E. F. HATHAWAY.
MECHANICAL CONTROLLING MECHANISM.
ORIGINAL FILED NOV. 10, 1916.

Inventor
Edgar F. Hathaway
by
Emery, Booth, Janney and Varney
Attys.

Feb. 6, 1923.
E. F. HATHAWAY.
MECHANICAL CONTROLLING MECHANISM.
ORIGINAL FILED NOV. 10, 1916.

1,444,503.

Inventor
Edgar F. Hathaway
by
Emery, Booth, Janney and Varney
Attys.

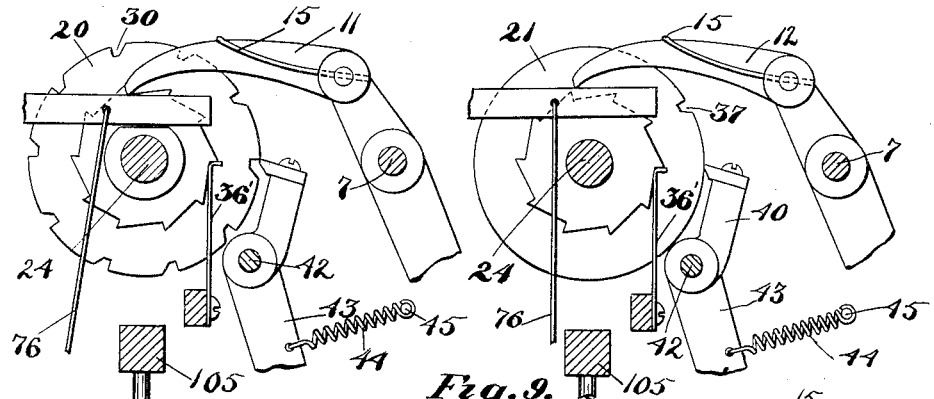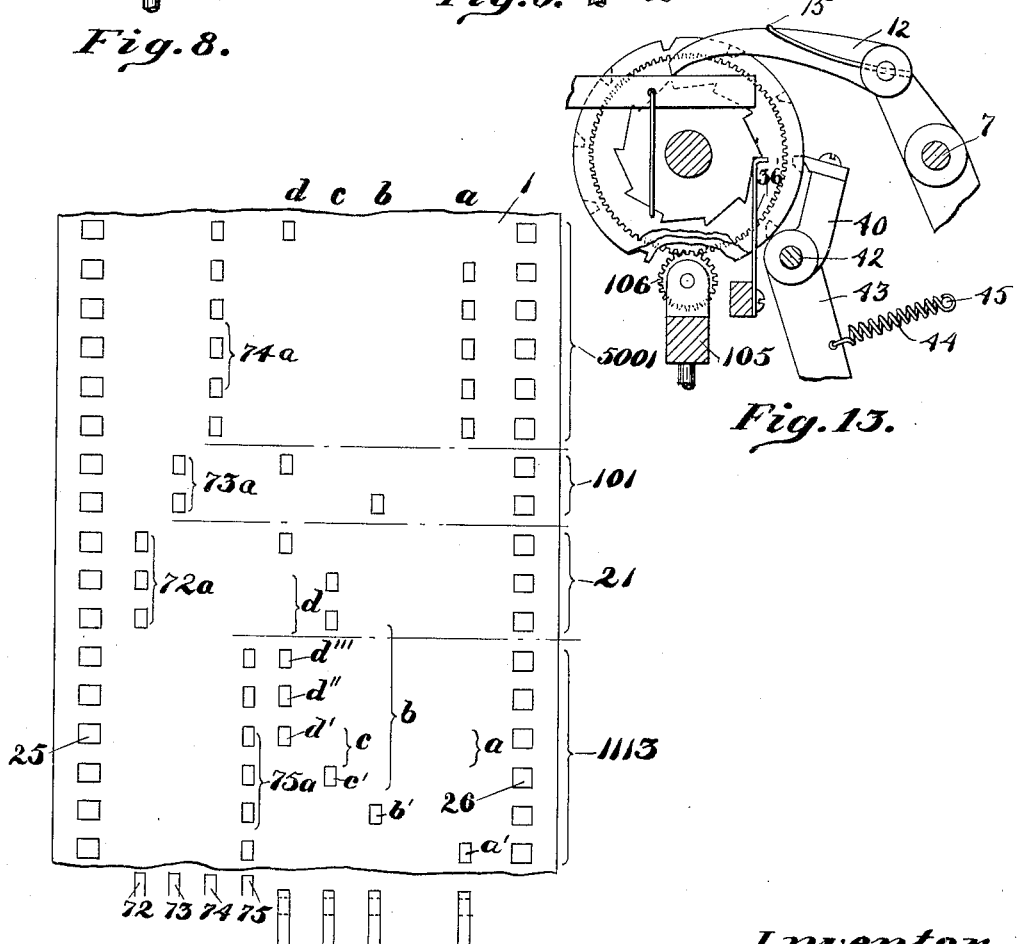

Feb. 6, 1923. 1,444,503.
E. F. HATHAWAY.
MECHANICAL CONTROLLING MECHANISM.
ORIGINAL FILED NOV. 10, 1916. 8 SHEETS—SHEET 8.

Inventor:
Edgar F. Hathaway,
by Emery Booth, Janney & Varney
Attys.

Patented Feb. 6, 1923.

1,444,503

UNITED STATES PATENT OFFICE.

EDGAR F. HATHAWAY, OF DORCHESTER, MASSACHUSETTS, ASSIGNOR TO SHAWMUT ENGINEERING COMPANY, OF DORCHESTER, MASSACHUSETTS, A CORPORATION OF MASSACHUSETTS.

MECHANICAL CONTROLLING MECHANISM.

Application filed November 10, 1916, Serial No. 130,672. Renewed May 19, 1920. Serial No. 382,642.

*To all whom it may concern:*

Be it known that I, EDGAR F. HATHAWAY, a citizen of the United States, and a resident of Dorchester, in the county of Suffolk and State of Massachusetts, have invented an Improvement in Mechanical Controlling Mechanism, of which the following description, in connection with the accompanying drawings, is a specification, like characters on the drawings representing like parts.

This invention relates to mechanical controlling mechanism. In order that the principle of my invention may readily be understood, I have disclosed in the accompanying drawings one form of mechanism typifying my invention. In said drawings:

Fig. 1 is a left hand side elevation of mechanism embodying my invention;

Fig. 2 is a vertical longitudinal section of the mechanism shown in Fig. 1;

Fig. 6 is a detail in side elevation and vertical section showing the ultimately actuated members differently positioned than in Fig. 2;

Fig. 7 is a vertical transverse section upon the line 7—7 of Fig. 2, parts being omitted;

Fig. 8 is a side elevation of the units counter or element;

Fig. 9 is a similar elevation of the tens counter or element;

Fig. 13 is a view similar to Figs. 8 and 9, but showing the associated resetting means;

Fig. 21 is a diagram indicating the method of control and actuation effected by the pattern member.

Figure 3:
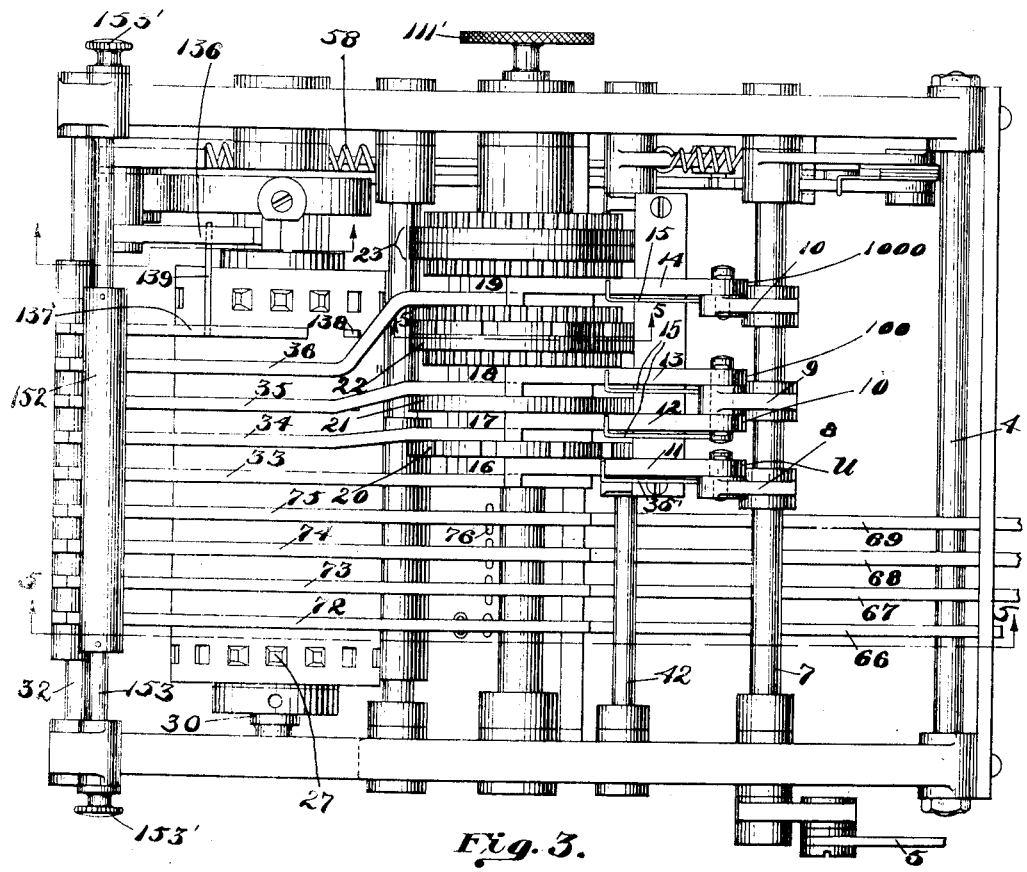
Fig. 3 is a plan view thereof.
Figure 15:
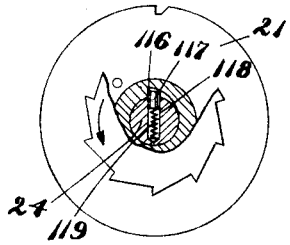
Fig. 15 is a detail in longitudinal section and side elevation of portions of the resetting means.
Figures 14, 16:
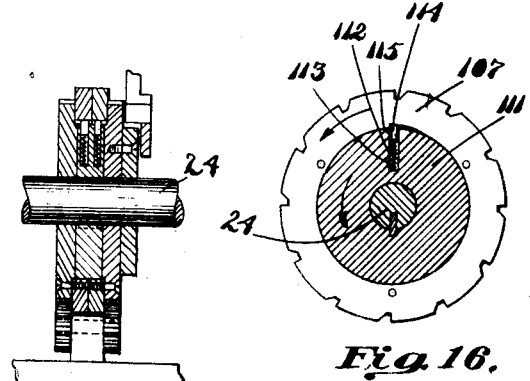
Fig. 14 is a detail in vertical transverse section of means for setting parts of the counting mechanism to zero or initial position.
Fig. 16 is a view similar to Fig. 15 but showing means for resetting another of the counter elements.
Figure 4:
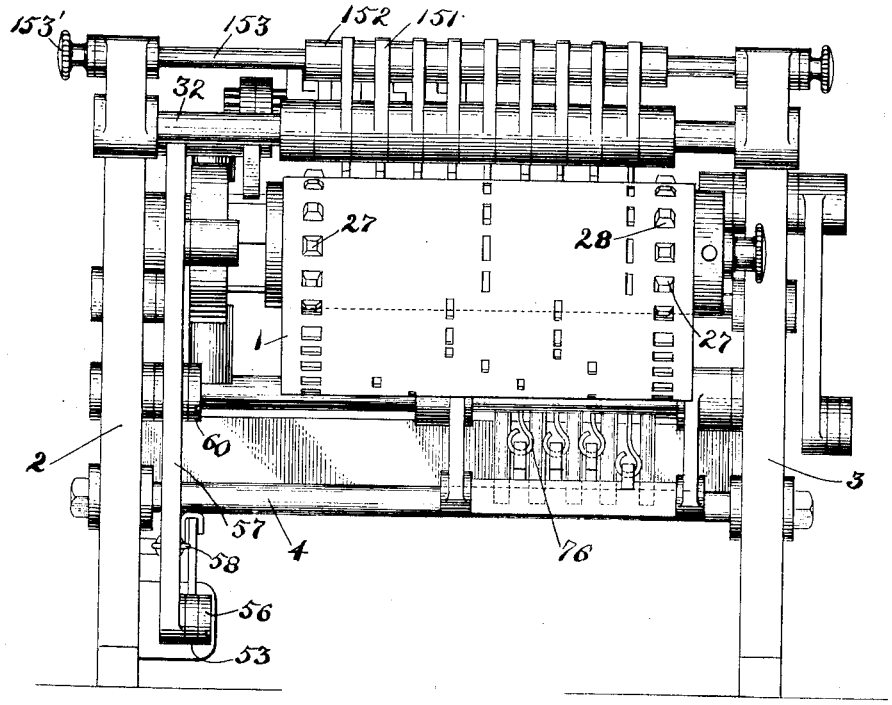
Fig. 4 is a rear elevation of said mechanism.

The invention herein disclosed is capable of manifold and varied applications and uses. In accordance therewith I provide an ultimately actuated member or plurality of members which may be employed to actuate or to indicate the actuation of any desired part or mechanism or for other purposes, as, for example, an operating part of a printing press for separating out groups of newspapers to be sent to different localities, such groups of newspapers differing frequently and widely in numbers; or as for example, the shuttle boxes of a loom for effecting a change of color in the weft, or for controlling the dobby or the jacquard thereof.

These two examples, widely differing in nature, will serve merely to indicate the large number of and varied uses to which my invention may be put.

In accordance with my invention, I provide a series of counter units or elements which may be two or more in number and which may be of any suitable form and construction, but which are herein represented as of disk form and as mounted for rotary movement upon a common shaft. The manner of mounting and the manner of actuating such counter elements may, however, be widely varied. Whatever their construction and arrangement, they are, however, preferably independently actuated and in this respect differ markedly from counting mechanism wherein for example a units disk when completely rotated actuates a tens disk, itself actuating a hundreds disk, etc. While I have herein indicated units, tens, hundreds, thousands and hundred thousands disks or counter elements, it is to be understood that these denominations are arbitrarily selected for the purpose of making clear one mode of operation of the mechanism embodying my invention. If desired, counter elements of any desired denomination may be employed, as for example, five and nineteen, it being merely necessary that the counter elements be of lower and higher orders.

In suitable relation to the counter elements, I provide a pattern member herein typified as a sheet and which may be and preferably is of endless character. The pattern member of whatever character is a part of the mechanism, though removable or replaceable by others. The said pattern as hereinafter set forth has prearranged and related counter actuating formations. The said pattern member is provided with formations herein characterized as openings, and said pattern member is previously perforated or the formations thereof are previously so established thereon that depending upon the sequence and arrangement of said openings or other formations, one or another of the counter elements is actuated, and after the actuation of one counter member, the same counter member or another counter member is actuated according to the call of the pattern until the indicated number has been counted by suitable actuation of the proper counter elements.

To give a concrete illustration, let it be assumed that it is desired to actuate some part, for example of a printing press, when 1113 papers have been printed and deposited. This may be effected by providing the pattern surface 1, shown diagrammatically in Fig. 21, with openings arranged in four different longitudinal rows or paths $a$, $b$, $c$ and $d$, as indicated in said figure, the row $a$ being aligned with or controlling the operation of the thousands counter member, the row $b$ controlling the operation of the hundreds member, the row $c$ controlling the operation of the tens member and the row $d$ controlling the operation of the units member. To count the selected number 1113, it is evident that this may readily be done by operating the thousands member once, then the hundreds member once, then the tens member once and then the units member three times in succession, whereupon the ultimately actuated member which was moved at the beginning of the count,—which in this case is a part of or is operatively connected to a printing press,—is again moved and as herein disclosed by the pattern member 1. Therefore, I have indicated in said figure the row $a$ as having a single perforation $a'$, the row $b$ as having a single perforation $b'$, the row $c$ as having a single perforation $c'$, and the row $d$ as having three perforations $d'$, $d''$, $d'''$.

A main drive shaft of the mechanism being connected up to the printing press, the movements of the press move and herein oscillate said main drive shaft, and effect movement of the pattern member or sheet 1, until the first opening, herein opening $d'$, permits a member to drop into or enter said opening, whereupon the thousands counter is permitted to be actuated by the described movements of the press. Just before the first unit of the said number 1113 is counted by movement of the thousands counter, an ultimately actuated member has been moved (through means hereinafter described) because a controlling opening in the pattern member 1, and which is in transverse alignment with said opening $a'$, has come beneath the same, and this causes movement of the ultimately controlled member and hence of some part of the printing press to indicate that the next sheet deposited is the first of the 1113 sheets to be counted. The action of the thousands counted continues until 1000 has been counted, whereupon the pattern sheet 1 is moved one step bringing the opening $b'$ into such position that it permits the actuation of the counter element 100, whereby one hundred movements of the press are counted. Thereupon the pattern member 1 is moved another step bringing the opening $c'$ into position to permit the actuation of the tens element, thus bringing the count to 1110, and thereupon the openings $d'$, $d''$ and $d'''$ are successively brought into such position that the units element is operated three times and the count is thus brought up to 1113.

When this predetermined count has been completed, then in any suitable manner the ultimately actuated member is again actuated, and the work to be accomplished is effected, as, for example, by separating out or indicating the separation of 1113 newspapers, whereupon the next count is begun.

It will be evident from the foregoing general statement indicating the manner of use of my invention that the counter members are governed in actuation responsively to the pattern. So far as I am aware, I am the first to employ counting mechanism comprising counter elements or means of lower and higher order operated responsively to and governed in operation by a pattern, and I desire to claim the same broadly.

Referring more particularly to the drawings, I have therein indicated the framing of the machine as composed of side uprights 2, 3 connected by suitable tie rods 4. In said framing I mount a suitable drive shaft not herein indicated and which receives movements from some suitable part of the mechanism wherein work is to be performed or some element is to function when a predetermined number has been counted. This drive shaft may have thereon any suitable means for conveying movements therefrom and preferably is provided with a crank disk, each rotation whereof imparts one complete reciprocation to a link or connecting rod 5, indicated most clearly in Figs. 1 and 3, and by which rocking movements are imparted to a lever arm 6 fast upon a transversely extending shaft 7, which in the disclosed embodiment of my invention constitutes an oscillating driving mechanism. Fast upon said shaft 7 which in this type of my invention is a rock shaft, are a series of brackets or arms 8, 9 and 10, whereon are pivotally mounted four pawls 11, 12, 13, 14, each downwardly pressed by a suitable spring 15, whereby the teeth of said pawls tend to engage the teeth of four ratchets 16, 17, 18 and 19, formed with or fast upon four counter elements 20, 21, 22, 23, which are respectively the units, tens, hundreds and thousands counter elements. Although in Fig. 12 I have shown a hundred thousands counter, I have not in the views representing the organization of the machine, shown the same as positioned, since to do so is unnecessary, for the principle of my invention may be indefinitely extended.

The said counter disks 20, 21, 22, 23 are each loose upon a stationary shaft 24 mounted in the framing of the machine.

In suitable relation to the counter elements or disks I position the pattern member which herein is represented as an endless sheet 1, having suitable perforations therein positioned in one or more rows and in numbers therein according to the count that is to be made. Instead of the openings, it is evident, as previously stated, that any suitable formations may be provided.

Figure 17:
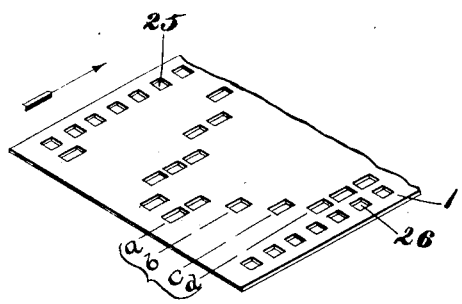
Fig. 17 is a perspective view of parts of the pattern member or sheet that may be employed in the practice of my invention.

The endless sheet 1 as indicated in Figs. 17 and 21 has at one or both edges holes 25, 26 into which take teeth 27, 28, upon a cylinder or barrel 29, or sleeve attached thereto, loose upon a stationary shaft 30 mounted in the side frames of the machine. While said cylinder or barrel may be of any suitable construction, it is preferably formed with parallel grooves 31, each of the entire length of the cylinder or barrel 29 and circumferentially arranged thereon, being spaced circumferentially apart a distance corresponding to the spacing of the teeth 25, 26, and therefore of the openings or other formations in the pattern member 1. The depth of the grooves 31 is such as to permit some suitable device to enter the openings in the pattern member 1, and thus to permit in proper sequence the actuation of the counter elements. For this purpose I have herein upon a tie rod or stationary shaft 32 at the rear of the machine mounted a series of devices, herein represented as levers 33, 34, 35 and 36, the number of which corresponds to the number of counter elements, and which in the disclosed embodiment of my invention are four in number. Each of said devices governs the actuation of the counter element with which it is associated, and in accordance with the call or indication of the pattern permits the initiation of the actuation of such corresponding counter element.

For this purpose each of the levers 33, 34, 35 and 36 is provided with a downwardly extending projection 33', etc., adapted to enter an opening in the pattern surface 1 when brought directly beneath such projection. The levers 33, 34, 35, 36 are of sufficient length to extend beneath the teeth of the respective pawls 11, 12, 13 and 14, and when the said levers are maintained in their elevated positions by reason of the absence of an opening beneath the projections 33', etc., the said pawls 11, 12, 13 and 14 are held out of operative relation to their respective ratchets 16, 17, 18 and 19. When an opening in the pattern surface 1 is brought beneath a projection upon one of said levers 33, 34, 35, 36, such lever is permitted to descend and the corresponding pawl 11, 12, 13 or 14 is brought into operative relation with its ratchet 16, 17, 18 or 19, so that in the continued movements of the link or connecting rod 5 and the lever 6, a step by step movement is imparted to the corresponding counter element, the number of such movements depending of course upon the denomination or order of the counter disk or element.

Each of the ratchets 16, 17, 18, 19 is provided with some suitable device, such as a spring or pawl 36' preventing accidental reverse movement of said ratchets.

Each of the counter elements is provided with transverse slots or formations, the number whereof depends upon the order or denomination of the counter element wherein it or they are formed. In that type of my invention herein disclosed, the units counter is provided with ten such slots 37 (there being ten teeth upon the ratchet 16 thereof), the tens counter or elements is provided with one slot 37 (there being ten teeth upon the ratchet 17 thereof), the hundreds counter being provided with ten slots 37 in one disk or part thereof, with which as hereinafter more specifically described, a single slot of another disk or part of said counter is to be brought into alignment, and the thousands counter, as hereinafter more specifically described, being provided with a single slot 37 in each of two disks of which the same is composed. In this or in any other suitable manner the slots 37 of all the counter elements are adapted to be brought into alignment transversely of the machine, and when so brought into alignment governed or controlled means are permitted to function, such means being governed by the associated counter units and itself governing the operative connections between the pattern member 1 and the main drive shaft or in the disclosed embodiment of the invention, the oscillating driving mechanism or part 5, 6. The said governed or controlled means in this embodiment of my invention comprises a bar 38, secured by screws 39 to two upwardly extending arms 40, 40 fast upon a sleeve 41 itself fast upon a shaft 42 mounted for rocking movement in the side frames of the machine. Also fast upon said rock shaft 42 is a lever arm 43 to which is connected a spring 44, itself connected at 45 to the framing of the machine and normally acting to move said lever arm 43 to the right viewing Fig. 2.

The lower or free end of said lever 43 is provided with a laterally projecting extension 46, which when the bar 38 is prevented from entering the slots 37, engages the tooth 47 of a pawl 48, pivoted at 49 upon the lower or free end of a lever arm 50, and normally downwardly spring pressed by a spring 51. The lever arm 50 is fast upon the rock shaft 7 and hence said lever arm 50 moves synchronously with the several pawls 11, 12, 13 and 14. When, however, the bar 38, constituting the governed or controlled means, is permitted to enter the slots 37, because the same have been brought into alignment transversely of the machine, and is moved thereinto by the spring 44, then the projection 46 is removed from beneath or from relation to the path of action of the tooth 47 of the pawl 48, and said tooth 47 is permitted to drop into engagement with a shoulder 52 upon a rod 53, which is herein shown as guided near its free end 54 in an eye 55. At its opposite end said rod 53 is pivotally connected at 56 to a lever arm 57 normally drawn toward the right viewing Fig. 2 by a coiled spring 58 connected to said lever arm 57 and to the frame of the machine at 59. Said lever arm 57 may be mounted in any suitable manner, as for example upon the shaft 30 of the counting member or sheet 1, but in the disclosed embodiment of the invention I have represented the same as pivoted at 60 upon a stud projecting from the framing of the machine and having pivoted near its upper free end at 61, a yoke 62 shown most clearly in Fig. 19 and having pawls 63, 64 either one of which (according to the direction of movement of the pattern member) is adapted to engage teeth 65, in a manner hereinafter more fully described, thereby to drive said pattern member 1.

In this or in any other suitable manner the governed or controlled means herein exemplified as the bar 38 and which is itself governed in its movement by the alignment of the slots 37 in the several counter elements, governs the operative connection between the pattern member 1 or the drum whereon the same is mounted, and the shaft 7 which receives movements as previously stated from the press or other organization to which the mechanism of my invention is applied.

I have previously stated that the mechanism is provided with one or more ultimately actuated members, by which the operation of some part of the organization to which my invention is applied is effected when the count is indicated. In the disclosed embodiment of my invention, I have represented four ultimately actuated members 66, 67, 68 and 69, shown in plan in Fig. 3, and two of which are shown in each of Figs. 2, 5 and 6. The said ultimately actuated members may be of any suitable nature and may be positioned or rendered potential in any suitable manner. Herein each of said members is formed as a rod and at their forward ends the same are guided in a bar 70 having spaced notches 71. Each member preferably has two notches 71' at its under side, one of which engages a transverse stop bar 71'' prior to actuation, and the other of which engages said bar after actuation.

In order to actuate or render potential the said ultimately actuated member or members, I may provide any suitable means, itself governed or positioned by the pattern member 1, but in the disclosed embodiment of my invention, I have represented said pattern member 1 as itself having formations or openings permitting the positioning of or rendering potential said ultimately actuated members. To this end, I make the pattern member 1 of sufficient width to provide for the formation therein of holes which will permit the movement of positioning means for the said ultimately actuated members. In the disclosed form of my invention, wherein I have represented four ultimately actuated members, 66, 67, 68 and 69, I provide four positioning means 72, 73, 74 and 75, shown most clearly in Fig. 3, and which are loosely pivoted upon the rod or stationary shaft 32. Each of said lever arms 72, 73, 74, 75 is provided with a corresponding projection adapted to enter an opening in the pattern surface 1 when brought beneath the same. Therefore in this form of my invention, I provide holes in the pattern member 1 in four rows corresponding to the four positioning means 72, 73, 74, 75.

In Fig. 21 I have diagrammatically indicated the four positioning means 72, 73, 74 and 75, and have therein indicated four lines of openings 72ª, 73ª, 74ª, 75ª controlling the movements of said positioning means, and in the disclosed embodiment of my invention permitting said positioning means to descend. Each of said positioning means is connected by a link 76, to the proper ultimately actuated member 66, 67, 68 or 69, so that when one of the said positioning means is permitted to descend the corresponding ultimately actuated member is permitted to descend and thus is brought into the field of movement of some member whereby some part of the printing or other mechanism is caused to function.

In Fig. 21 I have indicated the counting of the following amounts, namely, 1113, 21, 101 and 5001, and it will be observed that for the actuation of each counter element involved in the counting of the desired number, I have provided an opening in that part of the pattern member 1 which permits the descent of the positioning means or lever arm 72, 73, 74 and 75. For example, in counting 1113, the thousands counter element is actuated once, the hundreds counter element once, the tens counter element once and the units counter element three times; this totalling six actuations, and I have represented six openings 75ª, thus causing six downward movements of the ultimately actuated member corresponding thereto. In the present embodiment of my invention, I do permit or effect six downward movements of the ultimately actuated member between which downward movements the said member is repeatedly lifted, but the lifting thereof is at such times that the said ultimately actuated member is in fact never ultimately actuated after the actuation preceding or substantially coincident with the commencement of the count until the final opening of the series 75ª arrives in position beneath the projection upon the positioning member 75. That is, while in this form of my invention I do effect rising and falling movements of the said ultimately actuated member before the count is completed, the said member is always lifted before actuation thereof can be or is made.

If desired, I may and in certain forms of my invention I do provide but a single opening or other formation to control or permit the movement of the positioning means, so that the ultimately actuated member is not moved or does not become potential until the entire count is made. I will describe that form or type of my invention herein shown, it being, however, understood that my invention is of broad scope and is not limited in this respect.

As previously stated, the pattern surface 1 constitutes not only the pattern surface directly controlling the actuation of the several counter elements or disks but also constitutes the pattern surface controlling and permitting the descent of the levers 72, 73, 74, 75. My invention is, however, in its broad aspect in no wise restricted to such arrangement or organization and if desired I may within the scope of my invention cause the pattern surface or member 1 to act merely or mainly as the member controlling the movement of the lever arms 33, 34, 35 and 36, and thus control the actuation of the counter elements, and I may provide another pattern member or a plurality of pattern members which are moved only when each count has been completed. In such case, therefore, I will provide what I may term a counter pattern corresponding to the pattern member 1 and also provide a main pattern to be moved when each count is completed, and thus control the movements of the ultimately actuated members. Certain advantages reside in the employment of separate pattern members since in the organization herein illustrated, motion is imparted to the pattern member 1 in passing from the actuation of one counting element or disk to another, as may be necessary to count the number in question. Since what may be termed the main pattern is in this embodiment of the invention integral with the counter pattern, or since, in other words, the pattern member 1 acts both as a counter pattern and as a main pattern, there exists therefore motion of the main pattern between the beginning and the completion of the desired count, which motion I may wholly eliminate if desired by providing a main pattern structurally separate from the counter pattern.

It will be clear from the foregoing that in the disclosed embodiment of my invention when the counting of any number requires the use of two or more of the counting elements or the rotation of a single counting element more than once, there is actuation of the pattern surface 1 in the act of counting off the desired number, which actuation of the counter pattern need not be imparted to a main pattern excepting at the completion of each count, if the counter pattern and the main pattern be structurally distinct.

If a separate or main pattern be provided it may be placed upon a shaft other than the shaft whereon the pattern surface 1 is mounted. Such main pattern would preferably carry in successive lines openings or conformations indicative of the ultimate control desired with no intervening repetition. If a separate or main pattern be provided, preferably I provide another lever arm or feeler member to be caused to function by a separate line of perforations or conformations, and to be caused to function only when the desired number has been counted off by the counter elements, and the count completed. Such lever arm or feeler member would be operatively connected to the shaft carrying the main pattern as for example by controlling a pawl engaging a ratchet on a suitably notched disk, itself mounted upon a separate shaft carrying the main pattern member. In this or in any other suitable manner the main pattern will be shifted only when each total desired member has been counted off by the counter pattern member irrespective of the number of movements of such counter pattern member incompleting the count of that number.

Figure 22:
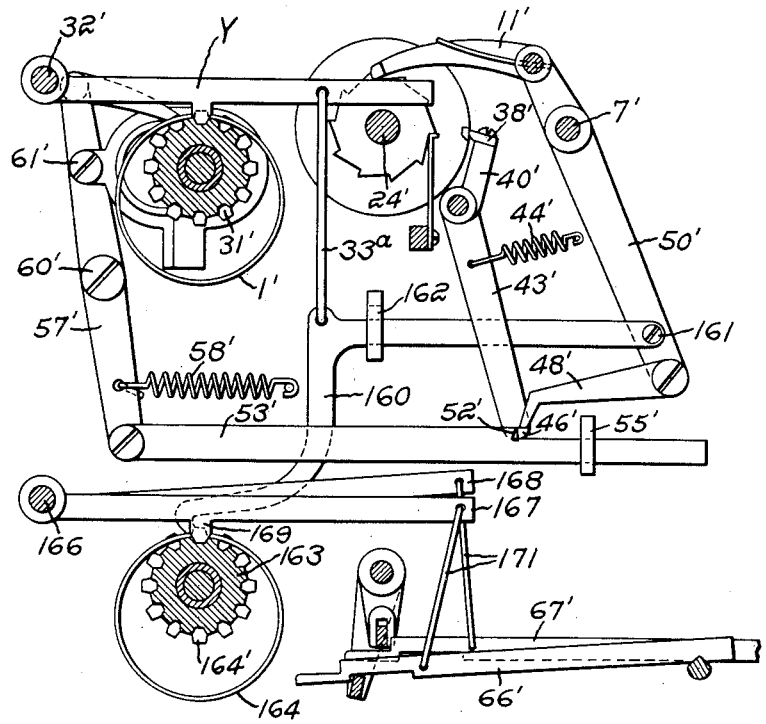
Fig. 22 is a vertical cross section of a slightly modified form of my invention.
Figure 23:
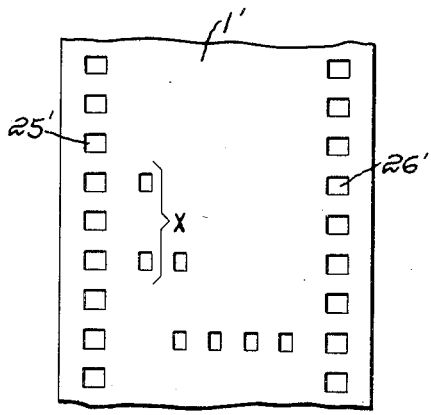
Fig. 23 is a plan view of a portion of the counter pattern member preferably used in such embodiment of my invention.
Figure 24:
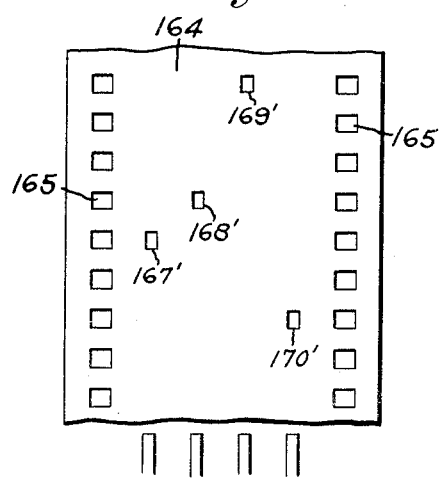
Fig. 24 is a similar view of a main pattern member also used in such embodiment of my invention.

In Figs. 22, 23 and 24 I have represented such modified embodiment or form of my invention. From Fig. 22 I have omitted certain parts shown in Fig. 2 for clearness of illustration. It is, however, to be understood that except as otherwise stated the construction is preferably the same as that illustrated in Fig. 2, and such of the parts shown both in Figs. 2 and 21 are in the latter figure indicated by a "prime".

The counter pattern is indicated at 1' in Figs. 22 and 23. As clearly shown in Fig. 23, the counter pattern is provided with the openings or formations controlling the levers 33, 34, 35 and 36, which themselves control the actuation of the several counter elements. Said counter pattern is also provided with a separate row of perforations or conformations indicated in Fig. 23 at X. Loosely mounted upon the stationary shaft 32' is a lever arm Y. Attached to and depending from the said lever Y is a link 33ª, which at its lower end is itself connected to a pawl 160. This pawl is pivotally connected as at 161 to the lever 50' so as to partake of the movement thereof, and is suitably guided as at 162. Said pawl is herein shown as a pull pawl, and at its lower end engages suitable teeth upon a drum 163 supporting a suitable main pattern 164, shown also in Fig. 24. Said drum 163 is provided with suitable teeth 164' engaging openings 165 at opposite edges of the main pattern 164, so as to be controlled in movement thereby.

Loosely pivoted at any suitable point, as, for example, upon a rod or shaft 166 are a series of levers, two of which are indicated at 167, 168, and which have projections, one of which is indicated at 169 to ride upon the surface of the main pattern 164, and to be controlled in their movements by openings therein or formations thereof, as indicated in Fig 24 at 167', 168', 169', 170'. Connected with the levers 167, 168, etc. are links 171 which are themselves connected to the ultimately actuated members 66', 67', etc., the operation of which need not be more fully described.

It will be evident that the lever arm or feeler member Y is caused to function by a separate line of perforations or conformations in or upon the counter member 1', and is caused to function only when the desired number has been counted off by the counter element and the count completed.

I refer to such modified form of my invention in order that the scope and breadth of the invention may be made clear, since so far as I am aware, I am the first to employ a pattern element or pattern elements for the purpose herein indicated.

In order to impart the functioning movements to the ultimately actuated members or rods 66, 67, 68, 69 I may provide any suitable means. Preferably I provide a movable abutment, which is caused to impart the functioning movements to said ultimately actuated members when the latter are dropped (without lifting thereof immediately following) or otherwise brought into functioning position.

Herein for the purpose, I have provided a rock shaft 77 mounted in the side framing of the machine, and fast thereon I have mounted a crank arm or rock member 78 pivotally connected at 79 to a link 80 that is pivotally connected at 81 to the lever arm 6 so as to partake of movement with the latter. Loose upon said shaft 77, I have mounted a sleeve 82 from which upwardly extends a crank arm or rock member 83, most clearly shown in Fig. 1, and pivotally connected at 84 to a link 85 that is itself pivotally connected at 81 to the lever arm 6 so as to partake of the movements thereof. Fixedly secured to the sleeve 82 by a set screw 86 is a hub 87 from which downwardly extends a rock arm 88 to which is connected at 89 one end of the movable abutment 90, previously referred to. The opposite end of said abutment is connected at 91 to a rock arm 92 mounted in parallelism to the rock arm 88 and itself provided with a hub 93 mounted loosely upon the shaft 77.

Fast upon the shaft 77 are two hubs 94, 95 held in position by set screws 96, 97, and having depending arms 98, 99 provided with closed slots 100, 101 at their lower ends, wherein are received the ends of a restorer member 102, which thus not only has oscillatory movement, but has capacity for yielding or vertical movement.

Each of the ultimately actuated members 66, 67, 68, 69 is provided with a notch or cut away portion 103 at its under side, and at its upper side is provided with a shoulder 104.

The construction and organization of parts are such that when an ultimately actuated member 66, 67, 68, 69, is permitted or caused to descend through the connections heretofore described, (and is not immediately thereafter raised), such ultimately actuated member is brought into the range of movement of the abutment 90, as indicated in Fig. 6, and which therefore in its movement toward the left or in the direction of the arrow in Fig. 6 imparts movement to the said ultimately actuated member with the result that in the machine to which my invention is operatively connected, some work is performed, or some functioning is indicated, which obviously may be of any desired character.

For example, the mechanism of my invention herein disclosed may be actuated synchronously with some cycle of operations in the controlled machine and at predetermined points in the sequence of operation of such controlled machine a change is brought about either from motion to absence of motion, or vice versa, or making a different setting of parts. Inasmuch as the ramifications and adaptation of my invention are manifold, it is unnecessary more than to indicate in a general way how the effect of the movements of the ultimately actuated members 66, 67, 68 and 69 may be conveyed or caused to become available.

The restorer 102 is provided to return each ultimately actuated member to its former position after the described movement thereof, and for this purpose said pusher 102 engages the shoulder 104 of whatever ultimately actuated member may be in a raised position and in a position to the left viewing Fig. 6 and restores the same to its initial position.

The pusher 102 is mounted to yield vertically to permit those rising movements of a lowered ultimately actuated member, that immediately follow such lowering movement or movements, as heretofore described.

I have stated that in the disclosed embodiment of my invention an ultimately actuated member is caused to descend upon each actuation of a counter element, and is then immediately raised because of the movement of the pattern surface 1 incident to the bringing of the next counter element into action. Therefore the final or functioning movement of the ultimately actuated member in question,—that is, its movement to the left viewing Fig. 6, under the influence of the abutment 90,—does not occur until the complete count is made, it having been made just before or just as the count begins. The timing of the movements of the abutment 90 and the restorer 102 are such that no longitudinal movements of a dropped ultimately actuated member 66, 67, 68, 69 is effected until the count is completed. The lifting of an ultimately actuated member which immediately follows a lowering thereof, occurs before the abutment 90 next swings to the left viewing Fig. 2, and hence indicating actuation of such member is prevented.

Preferably I provide means to permit and effect the resetting of the various counter elements or disks to zero position, this being frequently desirable for various purposes. To this end no special construction of the units disk 20 is necessary, the same as previously stated being of simple construction and having ten slots 37 equidistantly positioned about its periphery, and being held always in position with a notch 37 thereof in register with the bar 38 by means of its spring detent 36'. If desired, however, I may provide said units disk with resetting means substantially such as are provided with the other counter elements or disks.

Figure 11:
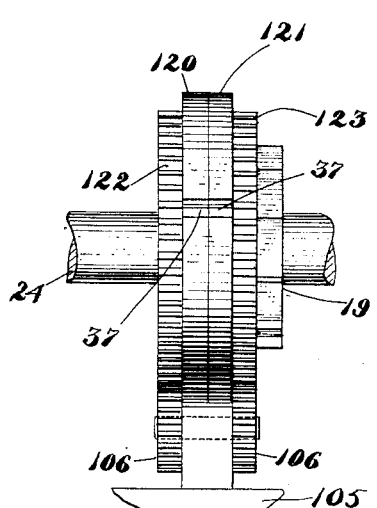
Figs. 10, 11 and 12 are front elevations, with parts broken away in Fig. 12, of the hundreds, the thousands and the hundred thousands counters or elements.
Figure 10:
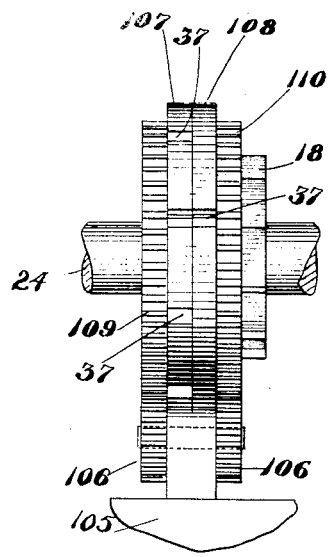
Figure 12:
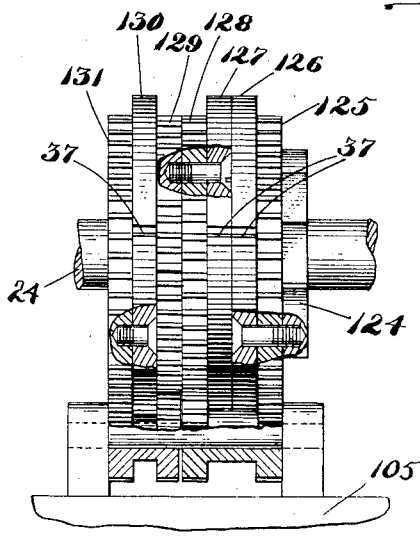

I have herein as a part of the resetting means, provided a transversely extending bar 105 which is mounted in the side framing of the machine, and is so mounted and arranged that it may be moved up and down manually so as to bring certain pinions carried thereby out of mesh with gears upon certain of the counter elements. To this end, said bar 105 is preferably pivoted at one end in one of the side frames of the machine and at its other end is normally held upwardly spring pressed but is provided with a handle or other means to permit the depression of said bar. The said bar is provided with a series of pinions 106, which as shown in Figs. 10, 11 and 12 are connected in pairs so that they may mesh with gears upon the counter disk referred to. Referring first to Fig. 10, where the hundreds counter element is shown, the same is provided with two disks 107, 108, the former having ten slots 37 and the latter having one slot 37 therein. Fast with the disk 107 is a gear 109 having one hundred teeth and fast with the disk 108 is a gear 110 having ninety-nine teeth. Fast with the gear 110 is the ratchet 18 having ten teeth by which movements are imparted to the hundreds counter element as already described. As already indicated, in order to cause the slot 37 of the disk 108 to align with one of the slots 37 of the disk 107, it is necessary to impart one hundred impulses of rotation to the disk 110.

In order to permit the ready resetting of this and other counter disks, each of said disks 107, 108, etc., is formed as a ring loosely mounted upon a barrel 111 having therein a radial socket 112 receiving a coil spring 113, normally pushing outward a tooth or pin 114 and which in the resetting operation engages a shoulder 115 formed upon the inner surface of the ring 107 or 108 and in the continued rotation of the barrel 111 fast upon the shaft 24 and which may be turned by hand by the knurled knob 111', each disk 107, 108 is picked up by its corresponding tooth 114, and the shoulders 115 are so located that this causes the alignment of the slots. The tens disk or element is somewhat similarly constructed but inasmuch as said disk or element is not provided with integrating disks and gears, it is merely necessary to form the disk 21 thereof with an internal shoulder 116 to receive the tooth or pin 117 mounted in the transverse slot 118 in the shaft 24 and normally outwardly pressed by the coil spring 119.

Similarly, the thousands counter element shown in Fig. 11 which is composed of two disks 120 and 121 each having a single slot 37 and respectively connected to gears 122 having one hundred teeth and 123 having ninety-nine teeth, and having its ratchet 19 provided with ten teeth, is equipped with the resetting notches and pawls described.

The one hundred thousands counter element shown in Fig. 12 is also similarly provided with resetting pawls and notches. The said hundred thousands counter element is provided with a ratchet 124 having ten teeth, said ratchet being fast with a gear 125 having ninety-nine teeth and a disk 126 having one slot 37. Adjacent to said disk 126 but free therefrom is a disk 127 having a single slot 37, and fast with two disks 128, 129 having respectively one hundred teeth and ninety-nine teeth. Adjacent to the gear 129 is a disk 130 having one slot 37 and fast with a gear 131 having one hundred teeth. In order to count 100,000 by this counter element, it is necessary to impart one hundred thousand impulses of rotation thereto, thus bringing the three slots 37 into alignment.

Figure 18:
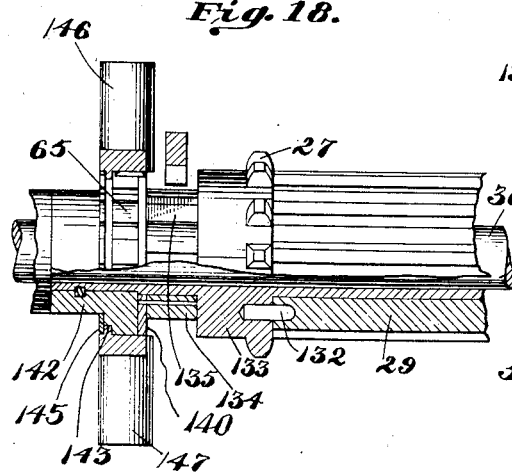
Fig. 18 is a detail in transverse section showing a portion of the pattern supporting surface and a portion of the direct driving and the reversing means therefor.
Figure 19:
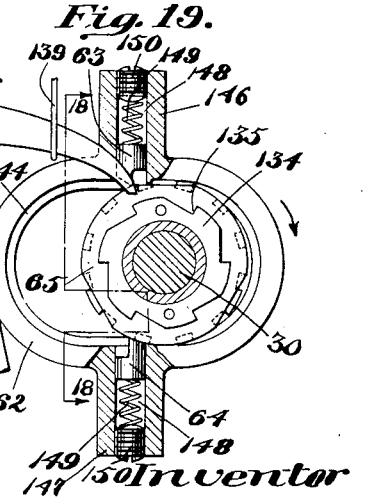
Fig. 19 is a detail in section at right angles to Fig. 18, of the direct driving and the reversing mechanism.

I preferably provide means for effecting the reverse movement of the pattern surface 1 at predetermined times. While for this purpose any suitable means may be provided, I shall describe one form thereof and at the same time describe more specifically the means whereby the swinging movements of the lever 57 are imparted to the pattern member 1, to effect either a forward or a return movement of said pattern member. Referring more particularly to Figs. 18 and 19, the pattern drum 29 is secured by one or more pins 132 to a sleeve 133, upon a recessed portion of which is loosely mounted a disk 134 having a series of ratchet teeth 135 with which is adapted to engage a pawl 136 pivotally mounted at 137 upon the upper or free end of the lever 57. As shown most clearly in Fig. 3, the position of the pawl 136, which constitutes the reversing pawl is controlled by a feeler finger or lever arm 137', which is loosely mounted upon the rod or stationary shaft 32, so as to overlie the pattern surface 1 and is provided at its under side with a projection adapted to enter any opening 138 that may be presented thereto. This permits said feeler finger to descend and through a connecting pin or wire 139 the said pawl 136 is permitted to descend and to engage a tooth 135 of the disk 134, turning said disk one sixth of a revolution. Further movement of the pattern surface 1 causes the elevation of the feeler finger 137 and therefore causes the pawl 136 to be lifted out of engagement with the teeth of the disk 134.

Figure 20:
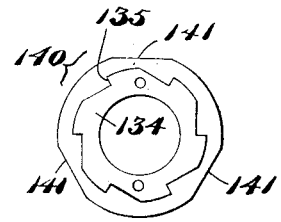
Fig. 20 is a detail in side elevation of a portion of the reversing mechanism.

As shown most clearly in Figs. 18 and 20, the disk 134 has secured thereto a cam disk 140 having three spaced, flattened portions 141. Said cam disk 140 being thus provided with three elevated and three flattened portions, the turning of said ratchet disk 134 through one sixth of a revolution causes an elevated portion of said cam 140 to conceal or to expose, as the case may be, square teeth 65 formed in a disk 142, which as most clearly shown in Fig. 18, is fast upon the sleeve 133. The said disk 142 is provided with a peripheral groove or shoulder 143 to receive a guiding formation 144 upon the yoke 62. To permit the ready assembling of the parts, I have herein represented a small ring 145 secured to the disk 142.

The said yoke 62 is provided with upwardly and downwardly extending prolongations 146, 147 substantially cylindrical in shape and receiving in the openings 148 thereof the pawls 63, 64, which are normally inwardly spring pressed by springs 149, 149 held in position by set screws 150.

It will be evident from the foregoing description that one or the other of the pawls 63, 64 is always effective in the reciprocations of the yoke 62, to engage the square teeth 65 of the disk or sleeve 142 and that thereby, depending upon which pawl 63, 64, is in action, the pattern surface is moved forwardly or rearwardly. With the parts in the position shown in Fig. 19, the pawl 63 is operative and therefore the pattern member 1 will be driven in a clockwise direction, the pawl 64 being withheld from engagement with the teeth 65, because of one of the elevated portions of the cam 140. When the pawl 136 is permitted to descend and imparts one sixth of a rotation to the cam disk 140, the pawl 63 is lifted from engagement with the teeth 65 by another elevated portion of the cam disk 140, and the pawl 64 is forced by its spring 149 into meshing relation with said teeth 65.

If desired, I may provide means whereby all of the various lever arms that ride upon the pattern member 1 may be removed from engagement therewith, thereby to permit the readjustment of said member, or to permit the positioning or removal of said member. While for this purpose any suitable means may be provided, I have in Figs. 2 and 5, represented each of said lever arms as having an upwardly extending projection 151 extending into the paths of movement of a series of cams 152 upon a transversely extending rod 153, and which may be manually or otherwise turned as by the knurled knobs 153' to cause said cams to lift said lever arms from engagement with the pattern surface.

Figure 5:
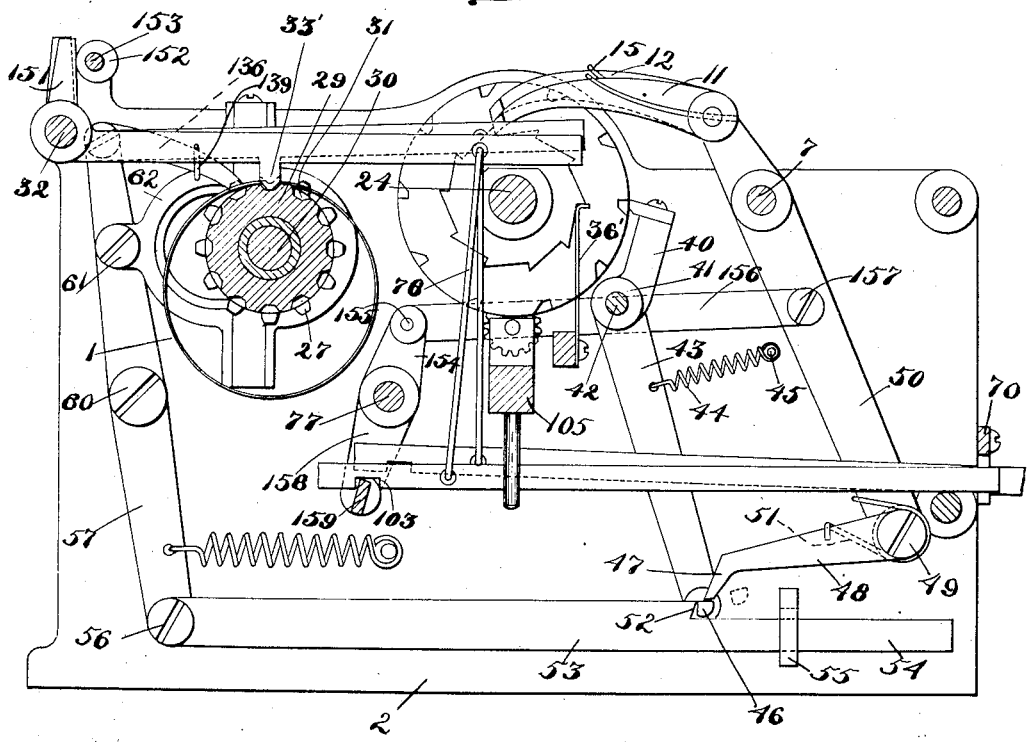
Fig. 5 is a vertical longitudinal section similar to Fig. 2, but of a slightly modified form of my invention.

In Fig. 5 I have represented a slightly modified form of my invention, which differs from that shown in Figs. 1, 2 and 3, only or mainly in that instead of employing a restorer member for the ultimately actuated members, such as shown at 102 in Fig. 7, the shaft 77 has fast thereon one or more arms 154 to which is pivotally connected at 155 a link or rod 156 itself pivotally connected at 157 to the lever arm 50. Fast upon the shaft 7 are a plurality of arms, one of which is indicated at 158 in Fig. 5 and which correspond in form and function to the arms 88, 92, of Fig. 7, and are connected by a transverse bar 159 adapted to engage the notches 103 in the ultimately actuated members. In this form of my invention, however, an ultimately actuated member that is lowered, is operated by the abutment 159 a number of times corresponding to the number of impulses given the counter element corresponding thereto; that is, one thousand times for the thousands counter, etc.

I have stated that the counter elements may be of any desired denomination, it being merely necessary that a plurality thereof be employed, and that they be of lower and higher order respectively. If desired, I may entirely dispense with the units counter member. This is partly because of the fact that upon each actuation of the units counter, a slot 37 thereof is always brought into aligning or registering position with the bar 38. Therefore, by omitting said units counter and by omitting the controlling openings $d$ therefor, in Fig. 21, the pattern member 1 may be caused to move one step without the employment of said units counter.

Assuming that it is desired to count 1,113, an opening in the pattern member 1 comes into such position that an ultimately actuated member 66, 67, 68 or 69 is dropped. Such member is at once moved to the left, viewing Fig. 2, and remains in its down position to the end of the count of 1,000. Then the pattern member 1 is moved one step, and while such pattern member is being moved, the said ultimately actuated member is lifted but is instantly dropped again, and hence before it can be moved back to the right, viewing Fig. 2, by the action of the movable abutment. Such again lowered ultimately actuated member remains dropped and at the left, viewing Fig. 2, during the count of 100. It is then again lifted but is at once dropped during the count of 10. It is again lifted but is at once again dropped and remains down during the count of 3. This completes the count of 1,113. At the end of such count the pattern member 1 is moved one step forward, and since now (see the line of holes 75ª in the diagrammatic Fig. 21) there is no hole presented to the action of the lever 72, 73, 74 or 75 controlling the said ultimately actuated member 66, 67, 68 or 69, such ultimately actuated member remains elevated. It is thereupon at once pushed over to the right, viewing Fig. 2, and some other ultimately actuated member is dropped. What member is dropped depends upon the formation of the pattern member 1.

While I have referred to a few uses of my invention, and to a few modifications of that form or type of my invention herein disclosed, it is to be understood that I am in no wise limited thereto.

Having thus described one illustrative embodiment of my invention, I desire it to be understood that although specific terms are employed, they are used in a generic and descriptive sense and not for purposes of limitation, the scope of the invention being set forth in the following claims.

Claims:

1. A pattern controlled counting mechanism comprising a plurality of rotatable counter elements of lower and higher order respectively; a common shaft whereon they are mounted and arranged for independent actuation, an oscillatory driving mechanism, a single controlling pattern arranged also to be driven from said driving mechanism, devices interposed between said pattern and driving mechanism for the counter elements and arranged to govern the actuation of said counter elements responsively to the pattern, together with means governed cooperatively by the associated counter elements and adapted to govern the connection of the pattern to the said oscillatory driving mechanism.

2. A pattern controlled counting mechanism comprising a plurality of rotatable counter elements of lower and higher order respectively, a common shaft whereon they are mounted and arranged for independent actuation, an oscillatory driving mechanism, a single controlling pattern arranged also to be driven from said driving mechanism, devices interposed between said pattern and driving mechanism for the counter elements and arranged to govern the actuation of said counter elements responsively to the pattern, together with means governed cooperatively by the associated counter elements and adapted to govern the connection of the pattern to the said oscillatory driving mechanism, one or more ultimately actuated members, and means controlled by the counter pattern to govern the movements of said ultimately actuated member or members.

3. Pattern controlled counter mechanism embodying a plurality of independently mounted ratchet driven, rotatable counting elements, a ratchet driven, rotatable pattern element constituting a part of the entire mechanism and having pre-arranged and related counting-element actuation-controlling formations, common driving means for the counting elements and the pattern element and including means whereby said counting elements are rotated independently of each other, and devices to connect each counting element separately to the said driving means, each said connecting means being operatively controlled by the said pattern element.

4. Counting mechanism comprising in combination, a plurality of independently mounted counter members of lower and higher order, means for independently operating said counter members, and pattern controlling means for said operating means, said pattern controlling means having prearranged and pre-inter-related counter actuation-controlling formations, and thereby co-ordinating the said members to represent a single predetermined number, and cooperating means caused to function when the counting of said predetermined number is effected.

5. Counting mechanism comprising in combination, a plurality of independently mounted counter members of lower and higher order, means for independently operating said counter members, pattern means to control the functioning of said counter members through said means and coordinating said members to represent a single predetermined number, and one or more ultimately actuated members governed by said pattern means.

6. Counting means comprising in combination, a plurality of independently mounted counter elements of lower and higher order, independent driving means for said elements, pattern means controlling the functioning of said counter elements, and means rendered active by the functioning of each counter element to effect movement in the pattern means.

7. Counting means comprising in combination, a plurality of independently mounted counter elements of lower and higher order, independent driving means for said elements, a pattern member controlling the functioning of said counter elements, and means rendered active by the functioning of each counter element to impart a step by step movement to said pattern member.

8. Counting means comprising a plurality of independently mounted and independently operated counter members, a pattern member therefor, means responsive to the pattern to permit the functioning of the selected counter members, a member governed by the associated counter members and itself governing the movements of said pattern member.

9. Counting means comprising a plurality of independently mounted and independently operated counter members, a pattern member therefor, means responsive to the pattern to permit the functioning of the selected counter members, a member governed by the associated counter members and itself governing the movements of said pattern member, and one or more ultimately actuated members controlled by said pattern member.

10. Counting means comprising in combination, a plurality of independently mounted counting elements of lower and higher order, means for independently driving said elements, a pattern member, devices adjacent to said pattern member and adapted to move in response to the pattern, said devices controlling the driving means for said counter elements, and means governed by the associated counter elements and governing the pattern member.

11. Counting means comprising in combination, a plurality of independently mounted counting elements of lower and higher order, means for independently driving said elements, a pattern member, devices adjacent to said pattern member and adapted to move in response to the pattern, said devices controlling the driving means for said counter elements, means governed by the associated counter elements, and connections therefrom to impart a step-by-step movement to said pattern.

12. Counting means comprising in combination, a plurality of independently mounted counting elements of lower and higher order, means for independently driving said elements, a pattern member, devices adjacent to said pattern member and adapted to move in response to the pattern, said devices controlling the driving means for said counter elements, means governed by the associated counter elements and adapted upon the functioning of each unit to effect movement of said pattern.

13. Counting means comprising in combination, a plurality of independently mounted counting elements of lower and higher order, means for independently driving said elements, a pattern member, devices adjacent to said pattern member and adapted to move in response to the pattern, said devices controlling the driving means for said counter elements, means governed by the associated counter elements, intermediate connections between said governed means and said pattern member, and one or more ultimately actuated members controlled by said pattern member.

14. Counting mechanism comprising in combination, a plurality of independently mounted counter disks, an oscillatory drive shaft therefor, pawls for independently driving said disks, a pattern sheet constituting a part of the mechanism and having prearranged and pre-inter-related counter-actuation controlling formations, devices to engage said pattern sheet and controlled in movement by the formations thereof, said devices controlling the movements of said pawls whereby said counter disks are coordinated from said pattern sheet to represent a single predetermined number and cooperating means caused to function when the counting of said predetermined number is effected.

15. Counting mechanism comprising in combination, a plurality of independent counter disks, an oscillatory drive shaft therefor, pawls for driving said disks, a pattern sheet, devices to engage said pattern sheet and controlled in movement by the formation thereof, said devices controlling the movements of said pawls, a member normally held from movement but moved upon the functioning of one or more counter disks, and connections between said member and said pattern sheet to effect movement of the latter.

16. Counting mechanism comprising in combination, a plurality of independent counter disks, an oscillatory drive shaft therefor, pawls for driving said disks, a pattern sheet, devices to engage said pattern sheet and controlled in movement by the formation thereof, said devices controlling the movements of said pawls, a member controlled in action by the associated counter disks, step by step driving means for said pattern sheet, and operative connections between said member and said step by step driving means.

17. Counting mechanism comprising in combination, a plurality of independent counter disks, an oscillatory drive shaft therefor, pawls for driving said disks, a pattern sheet, devices to engage said pattern sheet and controlled in movement by the formation thereof, said devices controlling the movements of said pawls, a member permitted to move by the successive functioning of the counter disks, ratchet and pawl drive mechanism for said pattern sheet, and connections intermediate said governed member and said ratchet and pawl drive mechanism.

18. Counting mechanism comprising in combination, a plurality of independent counter disks, an oscillatory drive shaft therefor, pawls for driving said disks, a pattern sheet, devices to engage said pattern sheet and controlled in movement by the formation thereof, said devices controlling the movements of said pawls, a bar arranged transversely of said counter disks and permitted to move by the functioning thereof, a ratchet and pawl driving mechanism for said pattern sheet and reciprocatory operating means for said ratchet and pawl driving mechanism governed by said bar.

19. Counting mechanism comprising in combination, a plurality of independent counter disks, an oscillatory drive shaft therefor, pawls for driving said disks, a pattern sheet, devices to engage said pattern sheet and controlled in movement by the formation thereof, said devices controlling the movements of said pawls, each of said counter disks having one or more controlling slots therein, a member adapted to enter said slots upon the functioning of a counter disk, ratchet and pawl driving means for said pattern sheet, and reciprocatory operating means for said ratchet and pawl driving means and governed by said member.

20. Counting mechanism comprising in combination, a plurality of independently mounted counter disks, an oscillatory drive shaft therefor, pawls for independently driving said disks, a pattern sheet, devices to engage said pattern sheet and controlled in movement by the formation thereof, certain of said devices controlling the movements of said pawls, whereby said pattern sheet coordinates said counter disks to represent a single predetermined number, and cooperating means caused to function when the counting of said predetermined number is effected.

21. Counting mechanism comprising in combination, a plurality of independently mounted counter disks, an oscillatory drive shaft therefor, pawls for independently driving said disks, a pattern sheet, devices to engage said pattern sheet and controlled in movement by the formation thereof, certain of said devices controlling the movements of said pawls, ultimately actuated members, connections between the same and certain of said devices, and means controlled by the functioning of said counter disks to move said pattern sheet.

22. Counting means comprising in combination, a plurality of independently mounted and independently driven counter members, a pattern member, means controlled by said pattern member to govern the counter members, and means governed by said counter members to govern said pattern member.

23. Counting means comprising in combination, a plurality of independently mounted and independently driven counter members, a pattern member, means controlled by said pattern member to govern the counter members, and means governed by said counter members to govern said pattern member, said means including means to drive said pattern member in a step by step manner.

24. Counting means comprising in combination, a plurality of independently mounted and independently driven counter members, a single shaft carrying all of said members, a pattern member, means controlled by said pattern member to govern the counter members, and coordinating said members to represent a single predetermined number and governing means to determine whether said pattern member shall be driven in a forward or in a reverse direction.

25. Counting means comprising in combination, a plurality of independently mounted and independently driven counter members, a pattern member, means controlled by said pattern member to govern the counter members, and means governed by said counter members to govern said pattern member, and one or more ultimately actuated members governed by said pattern member.

26. Counting means comprising in combination, a plurality of independently mounted and independently driven counter members, a pattern member, means controlled by said pattern member to govern the counter members, and means governed by said counter members to govern said pattern member, and one or more ultimately actuated members governed by the conjoint action of said pattern member and said counter members.

27. Counting means comprising in combination, a plurality of counter members, a pattern member, means controlled by said pattern member to govern the counter members, and means governed by said counter members to govern said pattern member, one or more ultimately actuated members, means controlled by said pattern member potentially to position said ultimately actuated members, and abutment means to impart movement to the potentially positioned ultimately actuated member.

28. Counting mechanism comprising in combination, a plurality of independently mounted and independently driven counter members, a pattern member constituting both a counter pattern and a main pattern, operative connections between the counter pattern and the counter members to govern the movement of the latter, and coordinating said members to represent a single predetermined number and connections from said main pattern to effect the movements of the ultimate mechanism to be governed.

29. Counting mechanism comprising in combination, a plurality of counter members of lower and higher order, a pattern sheet having thereon counter formations and main pattern formations, devices governed by said counter formations to control the movements of said counter members and coordinating said members to represent a single predetermined number, one or more ultimately actuated members, and means governed by said main pattern formations to control the movements of said ultimately actuated members.

30. Counting mechanism comprising in combination, a plurality of independently mounted and independently driven counter elements 20, 21, 22, 23, a pattern member 1, devices 33, 34, 35, 36 governed by said pattern member, and themselves controlling the movements of said counter members and coordinating said members to represent a single predetermined number, and ultimately actuated members 66, 67, 68 and 69 controlled in movement by said pattern member 1.

31. Counting mechanism comprising in combination, a plurality of independently mounted and independently driven counter elements 20, 21, 22, 23, a pattern member 1, devices 33, 34, 35, 36 governed by said pattern member and themselves controlling the movements of said counter members, a member 38 controlled by said counter elements, driving mechanism for said pattern member and operative connections between said member 38 and said driving mechanism.

32. Counting mechanism comprising in combination, a plurality of independently mounted and independently driven counter disks, a pattern controlling member therefor, devices governed by the pattern member but controlling the movements of said counter disks, and coordinating said disks to represent a single predetermined number and means itself governed by said pattern member to effect reversal of movement of said pattern member.

33. Interconnected pattern and counting mechanism having, in combination, pattern means, independent counting devices, driving means for all of said devices and including means independently to drive each of said counting devices, and separate means controlled by the said pattern means and counting devices and arranged to regulate the connection of each other to said driving means.

34. Counting mechanism comprising in combination, a plurality of individual counting disks, a shaft whereon said disks are mounted in parallelism, each of said disks needing a certain predetermined plurality of impulses to count to its maximum predetermined number before establishing or returning to its normal position, a cooperating pattern constituting a part of the counting mechanism, and means whereby the movement of said pattern is governed by said counting disks.

35. A pattern actuating counting mechanism embodying, in combination, with the controlled pattern cooperatively associated with an element to be controlled thereby; interconnected pattern moving devices and a plurality of counting instrumentalities mounted independently of each other, driving means for said pattern and for said instrumentalities and including means to drive said instrumentalities independently of each other, governing means controlled by said pattern and operative to regulate the connection of said driving means to said instrumentalities, and separate governing means controlled by said instrumentalities and operative to regulate the connection of said driving means to said pattern.

36. Counting means comprising in combination, a plurality of independently mounted and independently driven counter members, a pattern member, having pre-arranged and pre-inter-related controlling formations, means controlled by said formations of said pattern member to govern the counter members, and means governed by said counter members to govern said pattern member, one or more ultimately actuated members, means controlled by said pattern member potentially to position said ultimately actuated member or members, and abutment means to impart movement to the potentially positioned ultimately actuated member or members.

37. Counting mechanism comprising in combination, a plurality of individual counting members, each needing a certain predetermined plurality of impulses to count to its maximum predetermined number before establishing or returning to its initial position, a cooperating pattern having predetermined and related counter-actuation-controlling formations to control each of said counting elements and interrelated means whereby each counter upon reaching its maximum predetermined number thereupon controls or actuates the pattern.

38. Counting mechanism comprising in combination, a plurality of individual counting members each comprising a plurality of disks of lower and higher orders independently mounted and adapted for independent actuation and each needing a certain predetermined plurality of impulses to count to its maximum predetermined number before establishing or returning to its initial position and a cooperating pattern having pre-arranged and pre-interrelated counter-actuation-controlling formations to control said counting element and interrelated means whereby each counter upon reaching its maximum predetermined number thereupon controls or actuates the pattern.

39. Counting mechanism comprising in combination, a plurality of independent counting members comprising a plurality of rotary elements of lower and higher orders, a shaft whereon they are co-axially but independently mounted for independent actuation, each of said members needing a certain predetermined plurality of impulses to count to its maximum predetermined number before establishing or returning to its initial position and a cooperating pattern having pre-arranged and pre-interrelated counter-actuation-controlling formations to control or place in and out of operation each of said counting elements, and interrelated means whereby each counter upon reaching its maximum predetermined number thereupon controls or actuates the pattern.

40. Mechanical controlling means comprising in combination a plurality of independent counter members, a controlling member, means whereby said controlling member controls the counter members, means governed by said counter members to govern said controlling member, one or more ultimately actuated members, means controlled by said controlling member potentially to position said ultimately actuated member or members, and abutment means to impart movement to the potentially positioned ultimately actuated member or members.

41. Counting mechanism comprising in combination, a plurality of individual counting members each having its own distinctive maximum counting value and each needing a certain predetermined plurality of impulses to count to its maximum predetermined number before establishing or returning to its normal position, a cooperating pattern constituting a part of the counting mechanism, and coordinating said members to represent a predetermined number, and means whereby the movement of said pattern is governed by each of said counting members in accordance with the predetermined number to be counted.

42. Counting mechanism comprising in combination, a plurality of individual counting members, each having its own distinctive maximum counting value differing from that of each of the other counting members, and each needing a certain predetermined plurality of impulses to count to its maximum predetermined number before establishing or returning to its normal position, a cooperating pattern constituting a part of the counting mechanism, and coordinating said members to represent a predetermined number, means to move said pattern in a step-by-step manner, and means co-acting with said counting members whereby each of said counting members governs the movements of said pattern in accordance with the predetermined numbers to be counted.

43. Counting mechanism comprising in combination, a plurality of individual counting members, each needing a certain predetermined plurality of impulses to count to its maximum predetermined number before establishing or returning to its normal position, a cooperating pattern adapted to control said counting members, and coordinating said members to represent a single predetermined number and a cooperating member caused to function when the counting of said predetermined number is effected.

44. Counting mechanism comprising in combination, a plurality of individual counting members, each needing a certain predetermined plurality of impulses to count to its maximum predetermined number before establishing or returning to its normal position, a cooperating pattern adapted to control said counting members, and coordinating said members to represent a single predetermined number and one or more ultimately-actuated members caused by said pattern to function at the completion of the counting of said predetermined number by said counting members.

45. Counting mechanism comprising in combination, a plurality of counting members, a shaft whereon all of said members are mounted, means for independently operating said counter members at all times, each of said members needing a certain predetermined plurality of impulses to count to its maximum predetermined number before establishing or returning to its normal position, and a cooperating pattern constituting a part of the counting mechanism and adapted to control said counting members, and coordinating said members to represent a single predetermined number.

46. Counting mechanism comprising in combination, a plurality of individual counting members, each having its own distinctive maximum counting value and each needing a certain predetermined plurality of impulses to count to its maximum predetermined number before establishing or returning to its normal position, a cooperating pattern constituting a part of the counting mechanism and governed in its movement by each of said counting members in accordance with the number to be counted and cooperating means whereby said pattern controls the movement of said counting members.

47. Counting mechanism comprising in combination, a plurality of individual counting members of lower and higher numerical values respectively and each needing a certain predetermined plurality of impulses to count to its maximum predetermined number before establishing or returning to its normal position, a cooperating pattern constituting a part of the counting mechanism and governed in its movement by each of said counting members in accordance with the predetermined number to be counted and cooperatng means including a series of members whose positions are controlled by the formations of said pattern, whereby said pattern controls the movement of said counting members, and coordinating said members to represent a single predetermined number.

48. Counting mechanism having a part adapted to be operatively connected to a moving part of a machine, the operations whereof are to be counted and to be moved thereby, said counting mechanism also having a plurality of individual counting members independently mounted upon the same shaft and each needing a certain predetermined plurality of impulses to count to its maximum predetermined number before establishing or returning to its normal position, and a cooperating pattern constituting a part of the counting mechanism and adapted to control said counting members.

49. Counting mechanism having a part adapted to be operatively connected to a moving part of a machine, the operations whereof are to be counted and to be moved thereby, said counting mechanism also having a plurality of individual counting members, each having its own distinctive maximum counting value and each needing a certain predetermined plurality of impulses to count to its maximum predetermined number before establishing or returning to its normal position, a cooperating pattern constituting a part of the counting mechanism and adapted to control said counting members, and coordinating said members to represent a single predetermined number, and means whereby the movements of said pattern are governed by each of said counting members in accordance with said single predetermined number.

50. Counting mechanism comprising in combination, a plurality of individual counting members, each needing a certain predetermined plurality of impulses to count to its maximum predetermined number before establishing or returning to its normal position, a cooperating pattern, said pattern having a series of formations controlling the movements of said counting members, and coordinating said members to represent a single predetermined number, and one or more ultimately actuated members, said pattern having formations governing the functioning of said ultimately actuated member or members.

51. Counting mechanism comprising in combintion, a plurality of individual counting members, each needing a certain predetermined plurality of impulses to count to its maximum predetermined number before establishing or returning to its normal position, a cooperating pattern adapted to control said counting members and coordinating said members to represent a single predetermined number, one or more ultimately actuated members, and means controlled by said pattern whereby said ultimately actuated member or members is caused to function both at the beginning and at the ending of the counting of said predetermined number by said counting members.

52. Counting mechanism comprising in combination, a plurality of individual counting members, each needing a certain predetermined plurality of impulses to count to its maximum predetermined number before establishing or returning to its normal position, a cooperating pattern adapted to control said counting members and coordinating said members to represent a single predetermined number, one or more ultimately actuated members, and means co-operating both with said counting members and said pattern, whereby said ultimately actuated member or members functions both at the beginning and at the ending of the counting of said predetermined number by said counting members.

53. Counting mechanism comprising in combination, a plurality of individual counting members of lower and higher numerical values respectively and each needing a certain predetermined plurality of impulses to count to its maximum predetermined number before establishing or returning to its normal position, a co-operating pattern adapted to control said counting members, and coordinating said members to represent a single predetermined number and a governed or controlled member 38 co-operating with each of said counting members and itself controlling the movements of said pattern.

54. Counting mechanism comprising in combination, a plurality of individual counting members including disks independently mounted on the same shaft, and each needing a certain predetermined plurality of impulses to count to its maximum predetermined number before establishing or returning to its normal position, a co-operating pattern constituting a part of the counting mechanism and adapted to control said counting members, and means whereby the movement of said pattern is governed by the said counting members.

55. Counting mechanism comprising in combination, a plurality of individual counting members independently mounted on the same shaft and each needing a certain predetermined plurality of impulses to count to its maximum predetermined number before establishing or returning to its initial position, means for independently operating said counter members at all times and a cooperating pattern constituting a part of the mechanism and having pre-arranged and related counter actuation-controlling formations to control each of said counting elements, and coordinating said members to represent a single predetermined number.

56. Counting mechanism comprising in combination, a plurality of individual counting members, each needing a certain predetermined plurality of impulses to count to its maximum predetermined number before establishing or returning to its initial position, a cooperating pattern constituting a part of the mechanism and having pre-arranged and related counter actuation-controlling formations to control each of said counting elements, and coordinating said members to represent a single predetermined number and inter-related means whereby each counter upon reaching its predetermined maximum number controls the pattern.

57. Counting mechanism comprising in combination, a plurality of individual counting disks independently mounted upon the same shaft, and each needing a certain predetermined plurality of impulses to count to its maximum predetermined number before establishing or returning to its normal position, a cooperating pattern constituting a part of the counting mechanism, and means whereby the movement of said pattern is governed by said counting disks.

58. Counting mechanism comprising in combination, a plurality of individual counting members, each needing a certain predetermined plurality of impulses to count to its maximum predetermined number before establishing or returning to its normal position, a cooperating pattern, and adapted to control said counting members, and coordinating said members to represent a single predetermined number and one or more ultimately actuated members automatically operated by the counting mechanism so as to function at the completion of said predetermined count.

59. Counting mechanism comprising in combination, a plurality of independently mounted counter members of lower and higher order, means for independently operating said counter members, and pattern controlling means for said operating means, said pattern controlling means having pre-arranged and pre-inter-related counter actuation-controlling formations constituting a mechanically connected part of the counter mechanism and adapted to co-ordinate said counter members to represent a single predetermined number, and cooperating means caused to function when said predetermined number is effected.

60. Counting mechanism comprising in combination, a plurality of independently mounted counter members of lower and higher order arranged side by side, means for independently operating said counter members at all times, and pattern controlling means for said operating means, said pattern controlling means including a unitary member having pre-arranged and pre-inter-related actuation-controlling formations and adapted to control said counting members, and coordinating said members to represent a single predetermined number.

61. Counting mechanism comprising in combination, a plurality of independently mounted counter members of lower and higher order, means for independently operating said counter members, and pattern controlling means for said operating means, said pattern controlling means constituting a part of the counting mechanism and having prearranged and pre-inter-related counter actuation-controlling formations and coordinating said members to represent a single predetermined number, said pattern controlling means being adapted for re-use, as a part of the counting mechanism, to re-control the operating means for the counter members, thereby to effect the same counting totals as in the first use of the counting mechanism and cooperating means caused to function when said predetermined number is effected.

In testimony whereof, I have signed my name to this specification.

EDGAR F. HATHAWAY.